(12) United States Patent
Murata

(10) Patent No.: US 6,269,638 B1
(45) Date of Patent: Aug. 7, 2001

(54) AIR BUBBLE POWERED ROTARY DRIVING APPARATUS

(76) Inventor: Kazuaki Murata, 2-41-312. Toyooka 5-chome, Iruma-city (JP), 358-003

( * ) Notice: Subject to any disclaimer, the term of this patent is extended or adjusted under 35 U.S.C. 154(b) by 0 days.

(21) Appl. No.: 09/306,923

(22) Filed: May 7, 1999

(30) Foreign Application Priority Data

May 11, 1998 (JP) .................................................. 10-127427

(51) Int. Cl.[7] .................................................. F03C 5/00
(52) U.S. Cl. .................................................. 60/496; 415/4.1
(58) Field of Search .................................. 60/398, 407, 496; 415/4.1, 5, 7, 72, 75

(56) References Cited

U.S. PATENT DOCUMENTS 271,040 * 1/1883 Cook ....................................... 60/496
272,656 * 2/1883 Cook ....................................... 60/496

* cited by examiner

*Primary Examiner*—Edward K. Look
*Assistant Examiner*—Thomas E. Lazo
(74) *Attorney, Agent, or Firm*—Richard M. Goldberg

(57) ABSTRACT

A rotary driving apparatus using air bubbles comprises multiple rotating turbine wheels arranged one above the other and supported to be horizontally rotatable supported by sides of a tank having a gas inlet at the bottom thereof and a gas outlet at the top thereof, multiple vanes of each turbine wheel being curved or bent so that ascending gas bubbles contact the inner enclosed surface of each vane, and the multiple turbine wheels are interlocked to each other by means of gears, a chain or a belt. A rotary driving apparatus using gas bubbles also comprises one or more screws rotatably supported at the top and bottom ends of a tank having a gas inlet at the bottom thereof and a gas outlet at the top thereof, the screw or screws being placed where ascending gas bubbles contact the screw flight. The gas is introduced into a liquid and the buoyancy of the resulting gas bubbles is used to generate a rotary driving force.

9 Claims, 6 Drawing Sheets

US 6,269,638 B1

AIR BUBBLE POWERED ROTARY DRIVING APPARATUS

BACKGROUND OF THE INVENTION

The invention relates to an apparatus for converting discharged air into a rotary force.

Air blasts are used in many ways such as for cleaning and compressing. However, few concepts and technologies have been developed for using the air once blasted for other purposes.

The object of this invention is to generate a rotary driving force by the use of ascending air bubbles formed by injecting air into a liquid.

SUMMARY OF THE INVENTION

According to the present invention, the rotary driving apparatus comprises at least one rotatably mounted turbine wheel or screw submerged in a liquid, preferably water, and a gas introducing means for introducing gas into the liquid, arranged below the turbine wheel or screw, for forming gas bubbles which contact the vanes of the turbine wheel or screw surface whereby the turbine wheel or screw surface is caused to rotate.

In a preferred embodiment, the rotary driving apparatus which uses air bubbles for rotation comprises a multiplicity of rotatable turbine wheels arranged one above the other supported to be rotatable about a horizontal axis by sides of a liquid tank having an air inlet at the bottom thereof and an air outlet at the top thereof; multiple vanes of each turbine wheel being curved or bent so that ascending air bubbles contact the inner enclosed surface of each vane, the multiple turbine wheels or propellers being interlocked to each other by means of gears, a chain or a belt, and the like.

In a second preferred embodiment, the rotary driving apparatus which uses air bubbles for rotation comprises at least one vertically arranged screw turbine wheel or propeller having a shaft rotatably supported at the top and the bottom by the top and bottom ends of a liquid holding tank, the liquid holding tank having an air inlet at the bottom thereof and an air outlet at the top thereof, the screw turbine wheel or propeller being arranged so that ascending bubbles contact a surface of the screw, turbine wheel or propeller.

DETAILED DESCRIPTION OF THE INVENTION

As will be evident from the description above, the basic operating principle of this invention is to convert the energy of ascending gas (preferably air) bubbles formed by gas introduced into a liquid. Preferably, the gas is introduced into the liquid below the apparatus in rotary motion.

Figure 1:
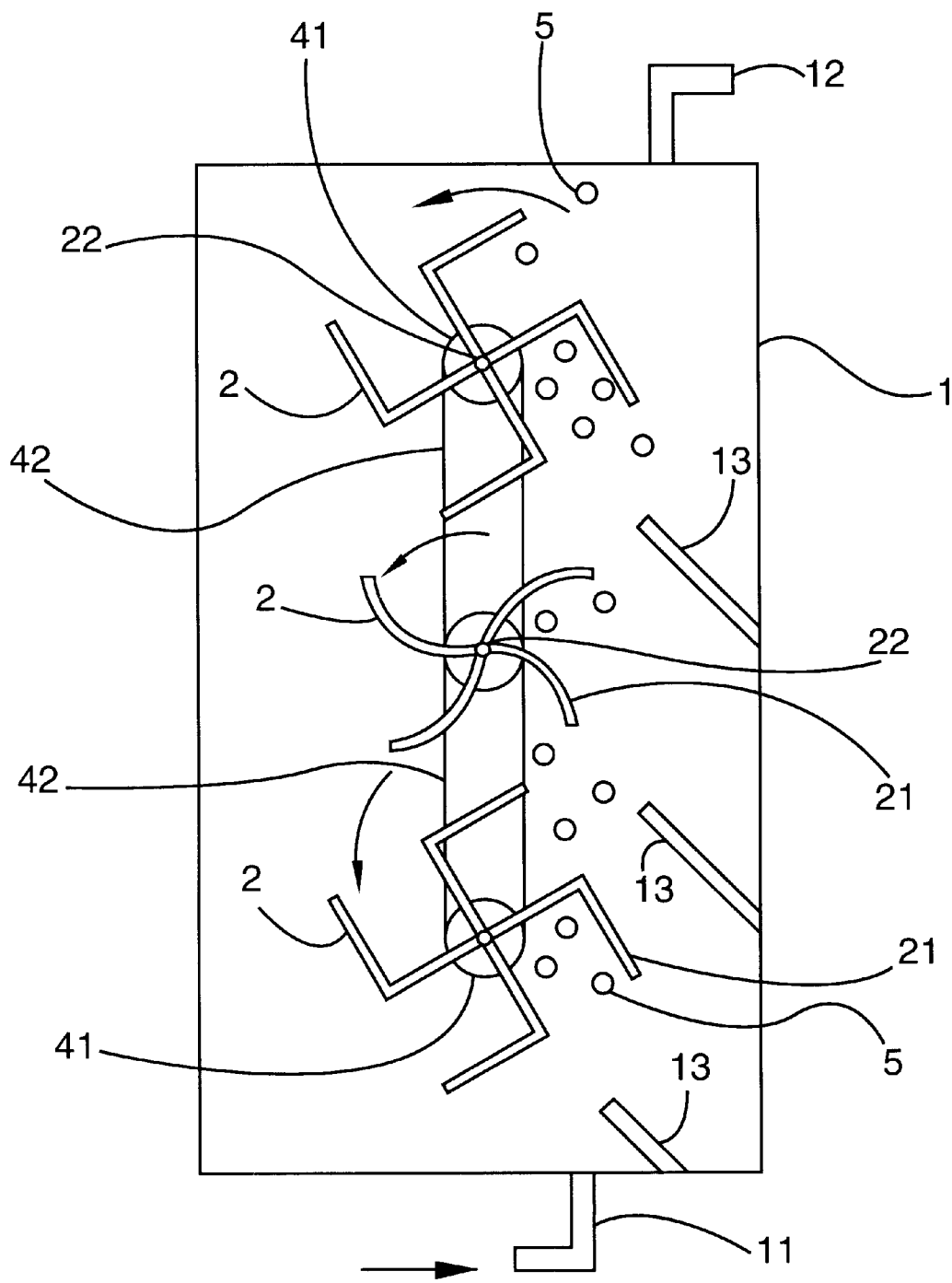
FIG. 1 is a side elevation of an embodiment of a rotary driving apparatus which comprises turbine wheels which rotate about a horizontal axis.

As shown in FIG. 1, the apparatus comprises multiple turbine wheels 2 rotatable with a horizontal shaft 22 supported in vessel 1 arranged to be turned by ascending gas bubbles 5. Multiple vanes 21 of each turbine wheel 2 are curved or bent so that the ascending gas bubbles 5 contact the inner enclosed surface of each vane.

The gas bubbles 5 caught by the inner surface of the curved or bent vanes 21 of turbine wheel 2 cause the turbine wheel 2 to rotate with the horizontal shaft 22.

The rotating turbine wheel 2 and a gas inlet 11 are preferably arranged so that the ascending gas bubbles 5 preferably contact the downwardly opened space defined by one of the vanes 21 with an upwardly projecting top surface.

Even if the air inlet 11 is arranged in a position such that the gas bubbles do not preferably contact a downwardly open space of vane 21 of turbine wheel 2, the gas bubbles 5 move upward along the downwardly slanted surface of the vane 21. Even then, the rotating turbine wheel 2 rotates with the one side thereof which captures the gas bubbles 5 moving upward because the ascending force of the gas bubbles working on the downwardly projecting vane is weaker than the force working on the downwardly opened vane.

The rotary turbine wheels 2 can be provided in multiples to increase the efficiency of conversion of the energy of the ascending gas bubbles 5 into rotary motion.

Shaft 22 supporting the turbine wheels 2 preferably have mounted thereon, gears or pulleys 41 which, through a belt 42 (shown), are arranged to provide a single rotary motion which comprises the sum of the forces from the individual turbine wheels.

Figure 2:
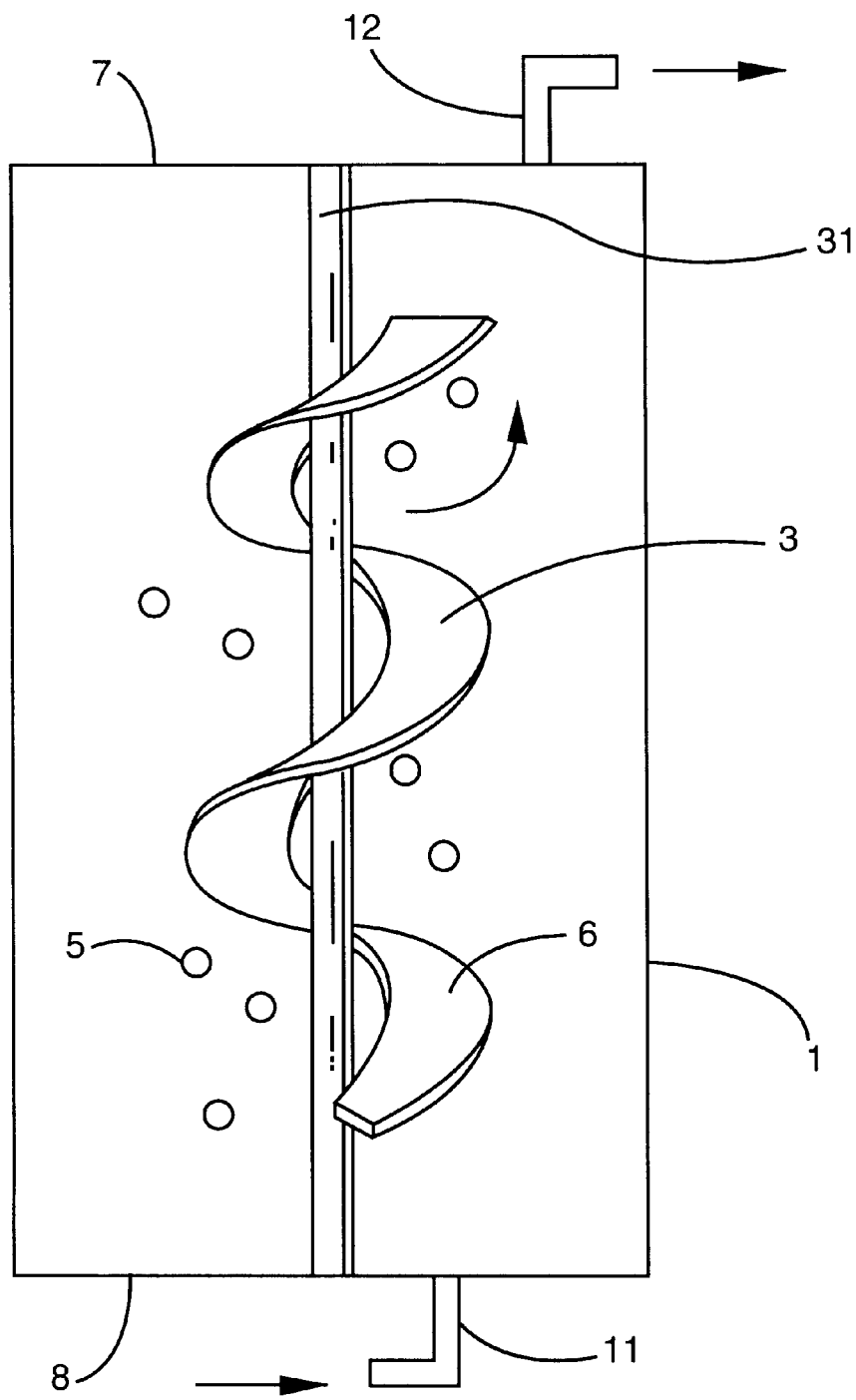
FIG. 2 is a side elevation of an embodiment of the rotary driving apparatus which comprises a screw arranged to rotate about a vertical axis.

The apparatus shown in FIG. 2 comprises a rotatable member 3 having a shaft 31 that is substantially vertically arranged and supported by the top 7 and bottom 8 ends of a liquid tank 1. The rotatable member 3 is rotated by ascending gas bubbles 5 that contact the surface of the screw flight 6 to thereby generate a rotary driving force. Instead of a screw flight 6, multiple turbine wheels or propellers arranged one above the other can be mounted on shaft 31 as shown in FIG. 6.

Figure 6:
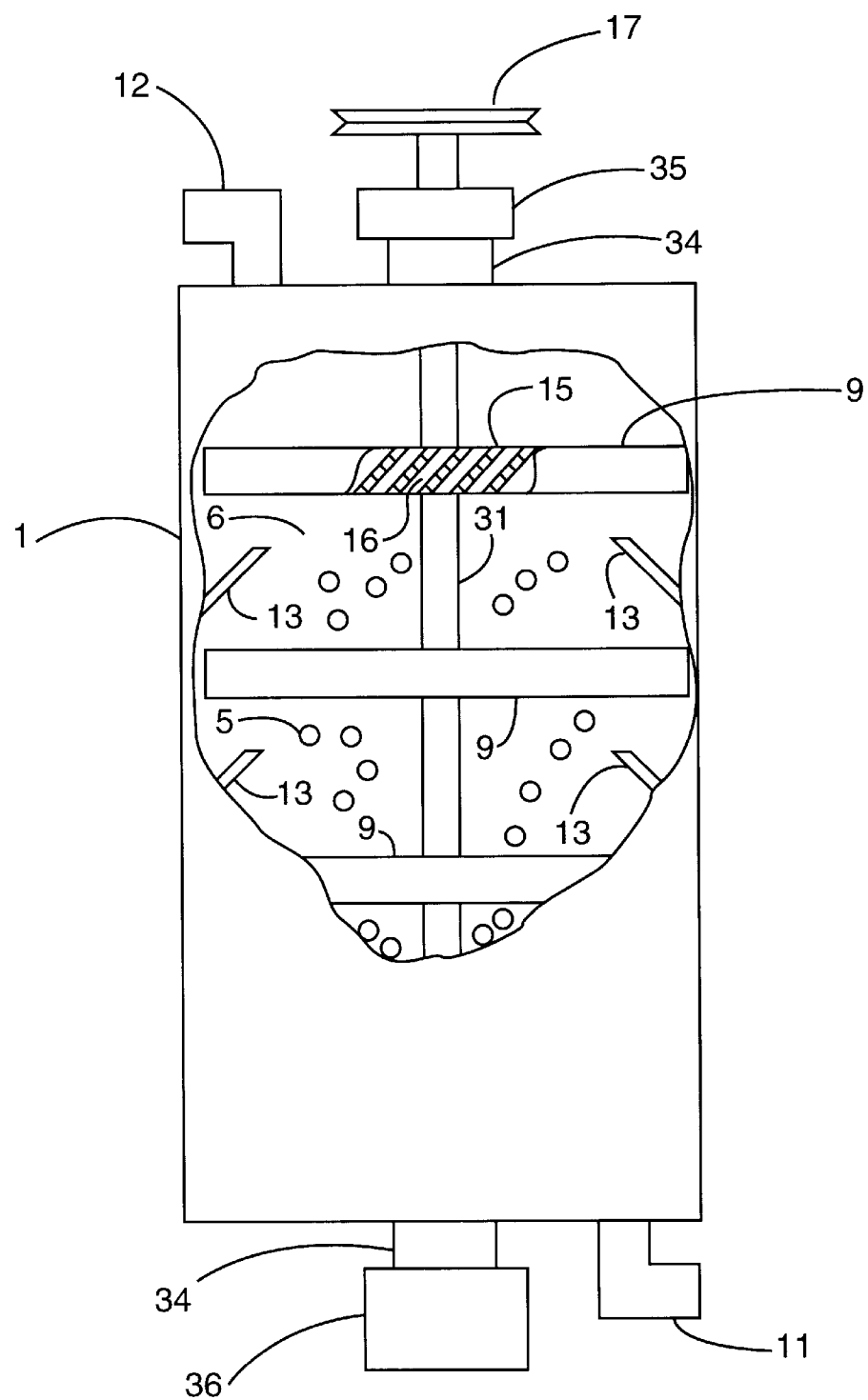
FIG. 6 is a view in partial cross-section of the embodiment of FIG. 2 having propellers or turbine wheels instead of a screw flight.

The rotatable member 3 may be of either a propeller or turbine type (as shown in FIG. 6) or a screw conveyor type as shown in FIG. 2. When a propeller or turbine wheel is arranged on vertical shaft 31, they are preferably provided in multiples to insure efficient conversion of the energy of the ascending gas bubbles 5 into rotary motion.

EMBODIMENTS

FIG. 1 shows an embodiment of the invention having the structure described above. Projecting plates 13 to guide the gas bubbles 5 toward the vanes 21 are provided to project obliquely upward on the inner side of the liquid tank where the gas bubbles 5 ascend.

This projecting plate decreases the percentage of gas bubbles 5 that pass through the gap between the side wall of the tank and the vanes 21 without contacting the vanes 21 and, therefore, without contributing to the generation of the rotary driving force.

Figure 3:
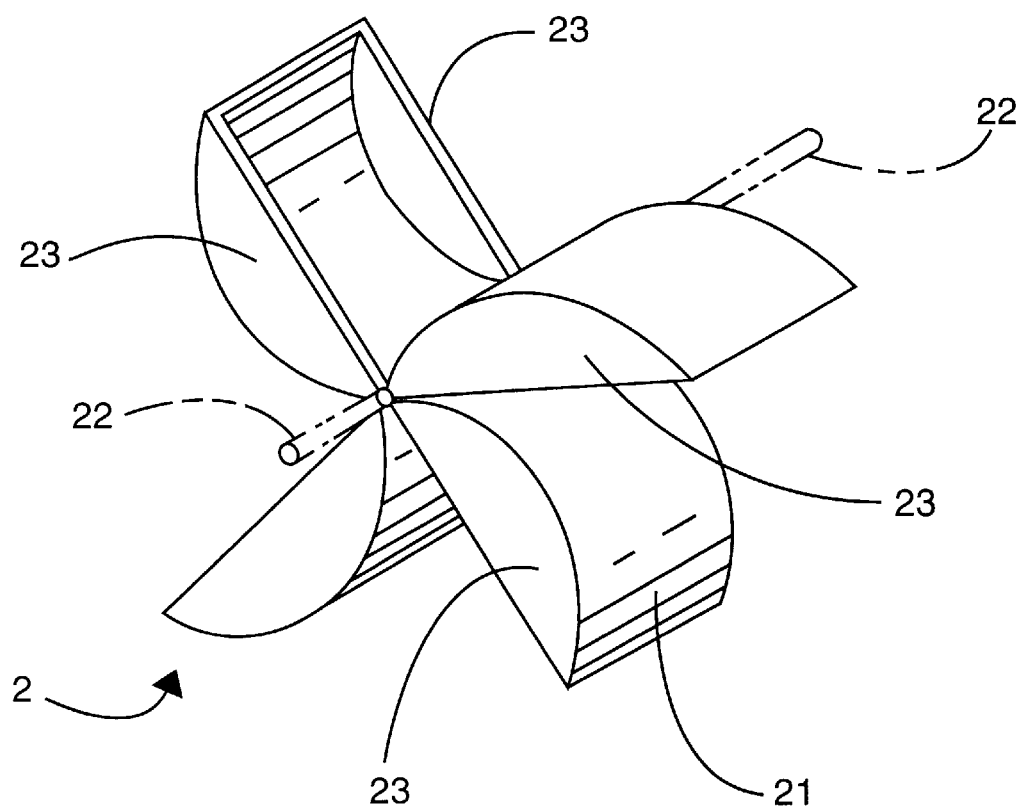
FIG. 3 is a perspective view of a turbine wheel of the embodiment shown in FIG. 1.

FIG. 3 shows an embodiment of the turbine wheel 2 of the apparatus shown in FIG. 1. Side plates 23 are provided on both sides of each vane 21 mounted on shaft 22 of the rotating turbine 2.

The side plates 23 keep the gas from the bubbles 5, trapped by the vane 21, from escaping from both sides thereof. The gas from bubbles 5 thus confined contribute to the upward motion of the turbine wheel 2 and a more efficient evolution of rotary motion.

Figure 4:
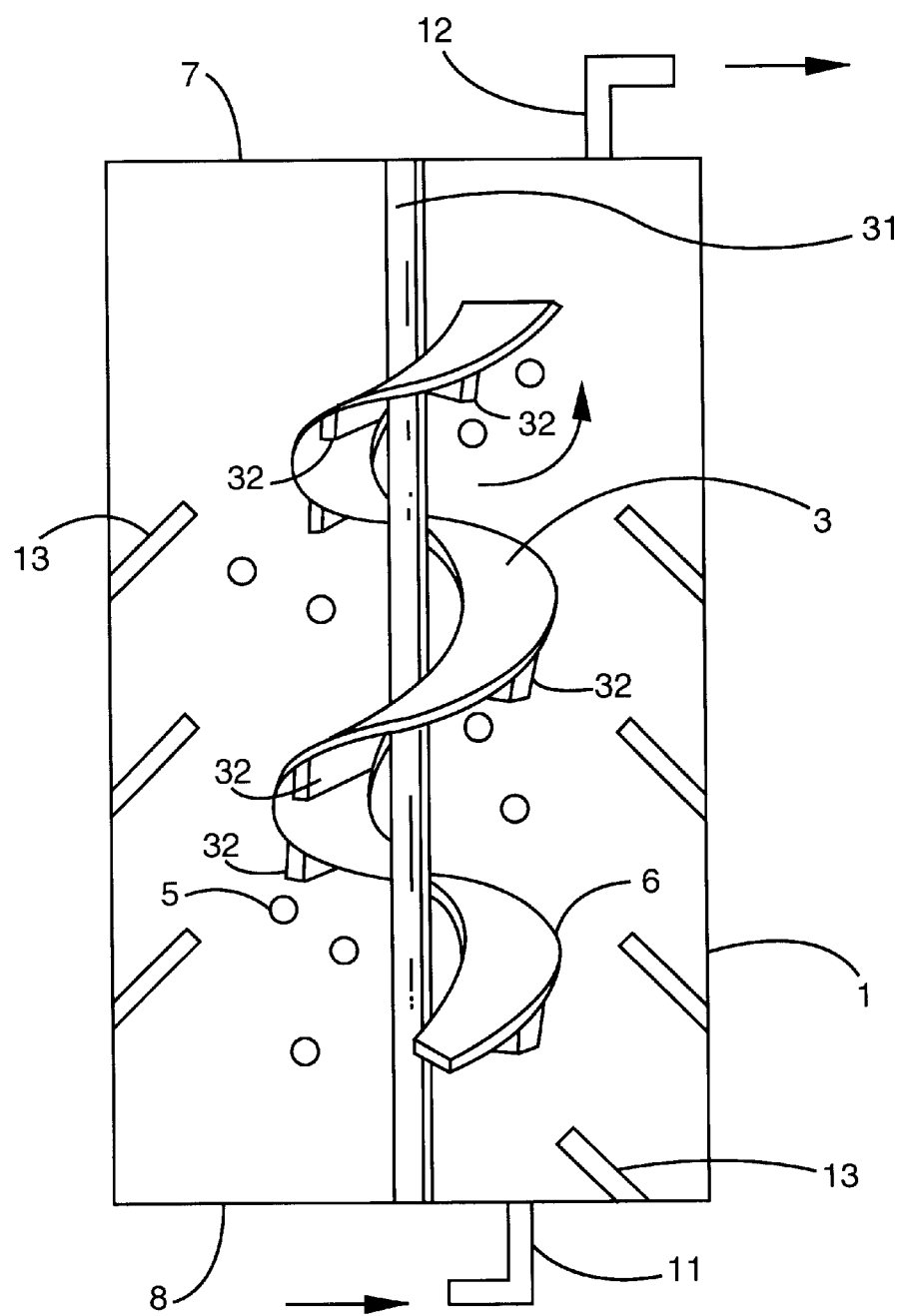
FIG. 4 is a cross-sectional side elevation view of a further embodiment the screw arrangement of the invention.

FIG. 4 shows a third embodiment that has holding plates 32 projecting obliquely downward to trap the air bubbles 5 below the screw 3. The plates 32 may be arranged obliquely to the downward facing surface of the screw flight.

The ascending bubbles 5 held below the screw 3 exert a rotary force on the under surface of not only the screw 3 but also the holding plates 32. The holding plates 32 make a contribution to the efficient evolution of rotary force in the structure (2) described above. Diverters 13 are placed to direct the rising gas bubbles toward the screw.

Figure 5:
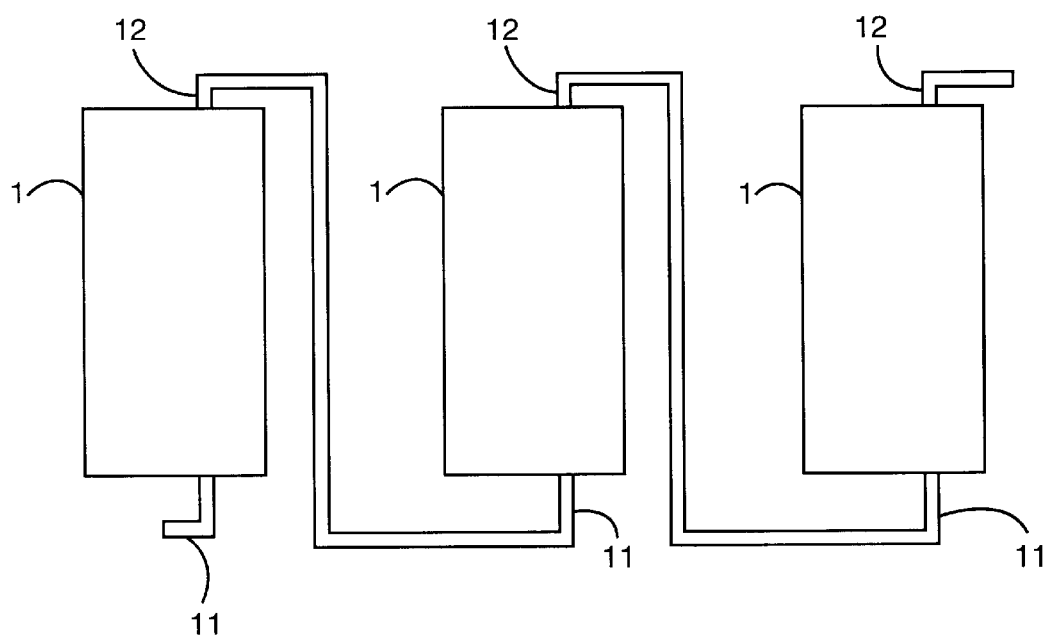
FIG. 5 is a schematic illustration of an embodiment of the invention where the gas is passed through tanks arranged in series which have arranged therein a rotary driving apparatus.

As shown in FIG. 5, the gas can be passed in series through multiple liquid tanks as shown in FIG. 4 in which an apparatus of the invention is arranged. Gas inlets 11 and gas outlets 12 on the individual tanks are interconnected with each other. The gas still retaining some energy at the top of a tank is led from the gas outlet 12 to the gas inlet 11 of an adjoining liquid tank to generate rotary motion. The use of liquid tanks 1 in series permits more effective use of gas energy in the generation of rotary motion.

FIG. 6 shows turbine wheels 9 arranged on shaft 31 mounted vertically in vessel 1 with gas inlet 11 and gas outlet 12. Upper turbine wheel 9 is shown cut away to show the inclined vanes 15 and gas passages 16 arranged in the turbine wheel. Plates 13 project obliquely into vessel 1 to guide the flow of gas bubbles 5 away from the walls of vessel 1 to the operating portion of turbine wheels 9. Turbine wheels 9 can be designed to approach the walls 5 of vessel 1 more closely so that plates 13 can be eliminated or the opening 6 substantially increased in size. Rotary motion can be taken off from pulley 17 mounted on shaft 31. Shaft 31 is mounted on vessel 1 with shaft sealing means 34 and is supported by radial bearing 35 and thrust and radial bearings 36.

The means for mounting shafts 31 and 22 in the apparatus are well known and will not be illustrated here. The apparatus can be designed to be used suspended in open water to use the energy from underwater gas vents or in large tanks.

As is obvious from the above, this invention permits efficient conversion of the energy of discharged gas into rotary motion.

The rotary motion thus obtained can be used for power generation and other forms of a power source.

What is claimed is:

1. A rotary driving apparatus which comprises: at least one screw flight mounted on a shelf rotatably supported on a vertical axis said shaft having means for taking off power in the form of rotary motion, a gas inlet arranged at or below the screw flight and a gas outlet arranged above the screw flight, the gas inlet facing a downward facing surface of the screw flight.

2. The rotary driving apparatus according to claim 1 which further comprises plates projecting obliquely upward to gas bubbles toward the screw flight.

3. The rotary driving apparatus of claim 1 wherein the screw flight comprises plates projecting from the downward facing surface of the screw flight.

4. The apparatus of claim 3 which further comprises plates projecting obliquely upward to direct gas bubbles toward the screws.

5. The rotary driving apparatus of claim 1 comprising at least two tanks comprising the screw flights arranged to provide flow of the gas through at least two tanks in series.

6. A rotary driving apparatus which comprises: a plurality of turbine wheels, arranged one above the other on a shaft rotatably supported on a vertical axis said shaft having means for taking off power in the form of rotary motion, a gas inlet arranged below the turbine wheels and a gas outlet arranged above the turbine wheels.

7. The rotary driving apparatus according to claim 6, in which a projecting plate is provided between each of the turbine wheels.

8. The apparatus of claim 6 further comprising plates projecting obliquely upward to direct gas bubbles toward the turbine wheels.

9. The rotary driving apparatus of claim 6 comprising at least two tanks comprising the turbine wheels arranged to provide flow of the gas through at least two tanks in series.

* * * * *